US012669936B2

(12) United States Patent
Gohain et al.

(10) Patent No.: US 12,669,936 B2
(45) Date of Patent: Jun. 30, 2026

(54) FOLDING OPERATIONS FOR IMPROVED SEQUENTIAL READ PERFORMANCE

(71) Applicant: Micron Technology, Inc., Boise, ID (US)

(72) Inventors: Nitul Gohain, Bangalore (IN); Nicola Colella, Capodrise (IT); Jameer Mulani, Bangalore (IN)

(73) Assignee: Micron Technology, Inc., Boise, ID (US)

( * ) Notice: Subject to any disclaimer, the term of this patent is extended or adjusted under 35 U.S.C. 154(b) by 66 days.

(21) Appl. No.: 18/395,222

(22) Filed: Dec. 22, 2023

(65) Prior Publication Data

US 2024/0220126 A1 Jul. 4, 2024

Related U.S. Application Data

(60) Provisional application No. 63/435,693, filed on Dec. 28, 2022.

(51) Int. Cl.
*G06F 3/06* (2006.01)

(52) U.S. Cl.
CPC ............ *G06F 3/0613* (2013.01); *G06F 3/064* (2013.01); *G06F 3/0659* (2013.01); *G06F 3/0679* (2013.01)

(58) Field of Classification Search
CPC ...... G06F 3/0513; G06F 3/064; G06F 3/0659; G06F 3/0679
See application file for complete search history.

(56) References Cited

U.S. PATENT DOCUMENTS

| | | | |
|---|---|---|---|
| 9,329,989 B2 * | 5/2016 | Sprouse | .............. G06F 12/0607 |
| 2005/0251726 A1 * | 11/2005 | Takamura | ......... H03M 13/2796 |
| | | | 714/755 |
| 2011/0153913 A1 * | 6/2011 | Huang | ................ G06F 12/0246 |
| | | | 711/E12.001 |

\* cited by examiner

*Primary Examiner* — Eric Cardwell
(74) *Attorney, Agent, or Firm* — Holland & Hart LLP

(57) ABSTRACT

Methods, systems, and devices for folding operations for improved sequential read performance are described. A memory system may perform a single-die access operation to program data to source data blocks of the memory system. The memory system may reorder the data during folding to destination data blocks of the memory system such that a multi-die access operation may be performed to sequentially read the data from the destination data blocks. For example, data may be programmed to the source data blocks in a first order as part of a single-die access operation, and the data may be folded to the destination data blocks in a second order as part of a single-die access operation, where the supports sequentially reading the data from the destination data blocks as part of a multi-die access operation.

20 Claims, 8 Drawing Sheets

405 — Determine to fold data

410 — Generate order to fold data

415 — Sense data from source blocks

420 — Program data to destination blocks

425 — Verifying data

430 — Updating mapping

435 — Reading data from destination blocks

400

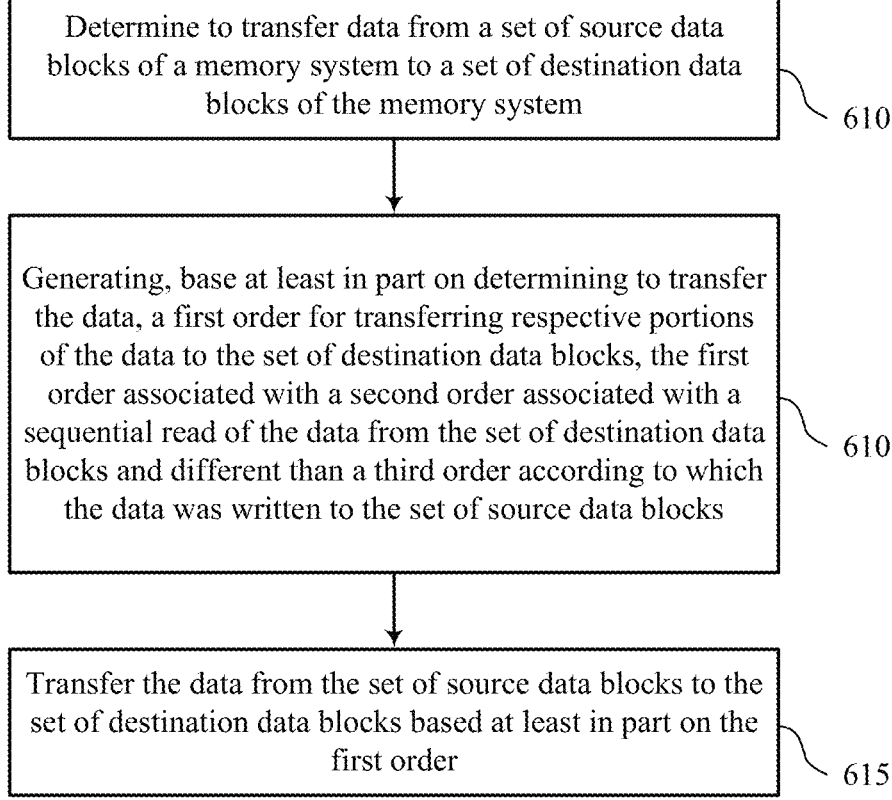

Determine to transfer data from a set of source data blocks of a memory system to a set of destination data blocks of the memory system

610

Generating, base at least in part on determining to transfer the data, a first order for transferring respective portions of the data to the set of destination data blocks, the first order associated with a second order associated with a sequential read of the data from the set of destination data blocks and different than a third order according to which the data was written to the set of source data blocks

610

Transfer the data from the set of source data blocks to the set of destination data blocks based at least in part on the first order

FOLDING OPERATIONS FOR IMPROVED SEQUENTIAL READ PERFORMANCE

CROSS REFERENCE

The present Application for Patent claims priority to and the benefit of U.S. Provisional Application No. 63/435,693 by Gohain et al., entitled "FOLDING OPERATIONS FOR IMPROVED SEQUENTIAL READ PERFORMANCE," filed Dec. 28, 2022, assigned to the assignee hereof, and expressly incorporated by reference in its entirety herein.

TECHNICAL FIELD

The following relates to one or more systems for memory, including folding operations for improved sequential read performance.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read (e.g., sense, detect, retrieve, identify, determine, evaluate) the state of one or more memory cells within the memory device. To store information, a component may write (e.g., program, set, assign) one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be described in terms of volatile configurations or non-volatile configurations. Volatile memory cells (e.g., DRAM) may lose their programmed states over time unless they are periodically refreshed by an external power source. Non-volatile memory cells (e.g., NAND) may maintain their programmed states for extended periods of time even in the absence of an external power source.

BRIEF DESCRIPTION OF THE DRAWINGS

FIG. 6 illustrates a flowchart showing a method or methods that support folding operations for improved sequential read performance in accordance with examples as disclosed herein.

DETAILED DESCRIPTION

Figure 1:
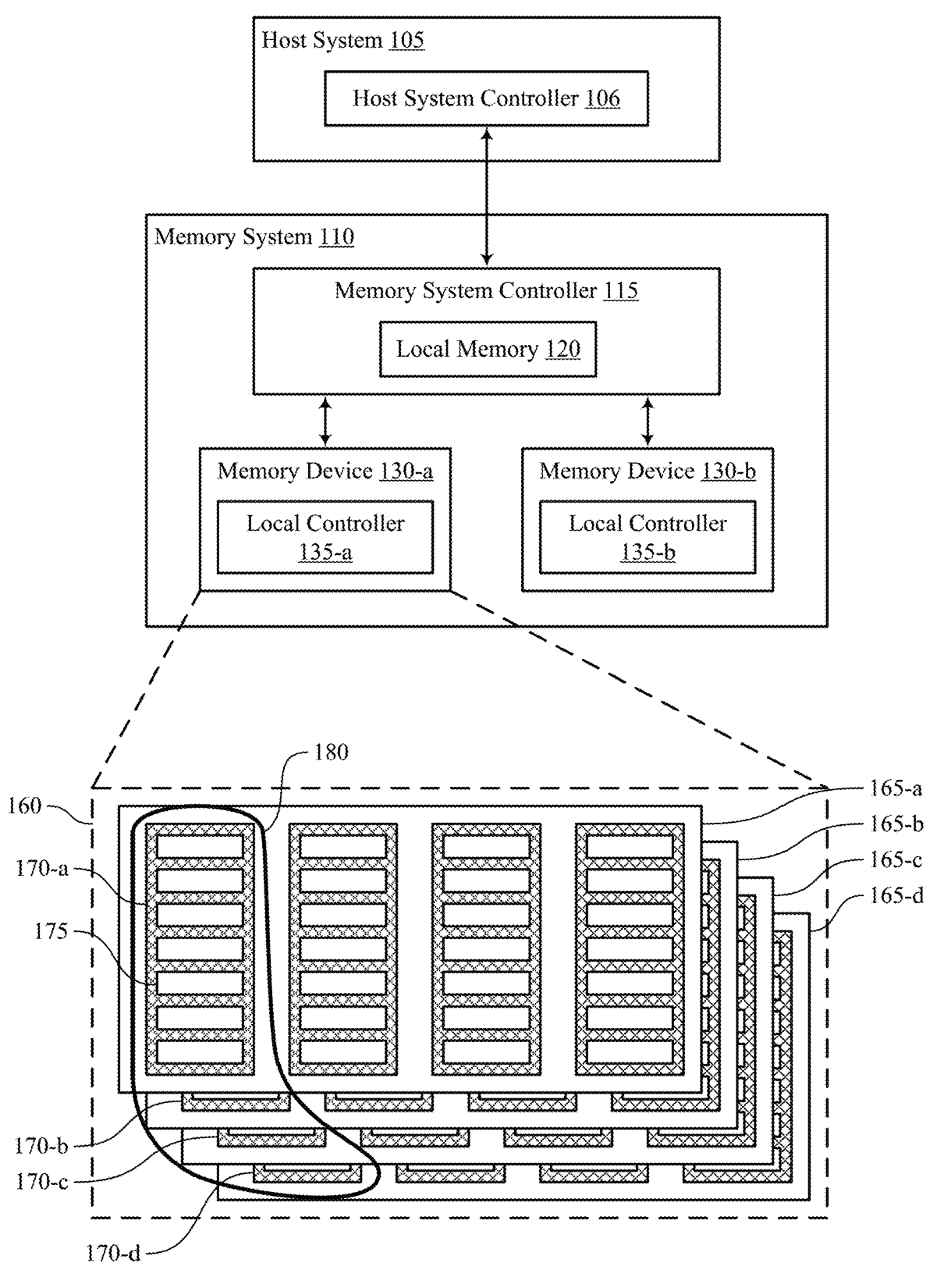
FIG. 1 illustrates an example of a system that supports folding operations for improved sequential read performance in accordance with examples as disclosed herein.

A memory system may implement a single-die access operation (e.g., which may be referred to as a small-z access operation) for programming (e.g., writing) data to one memory die of the memory system at a time (e.g., before beginning programming data to a subsequent memory die). The single-die access operation may be associated with using less volatile memory (e.g., static random access memory (SRAM)) for programming the data than a multi-die access operation (e.g., which may be referred to as a big-Z access operation), in which the data may be sequentially programmed across the memory dies of the memory system (e.g., interleaved across the memory dies). For this reason, the single-die access operation may be used while folding (e.g., transferring) the data from one or more source data blocks of the memory system to one or more destination data blocks. In some cases, the data may be folded (e.g., transferred) to the one or more destination data blocks based on an order in which the data was programmed (e.g., programmed order) to the one or more source data blocks. In some cases, however, reading the data from the one or more destination data blocks (e.g., to a host system) that was folded according to the programmed order may cause more volatile memory to be used, result in slower reading speed of the data (e.g., increased read latency), or a combination thereof.

For example, performing the multi-die access operation to read the data in the programmed order may produce a nonsequential read order, causing the volatile memory to store the out-of-order data from one memory die until the missing data from one or more other memory dies is read, thereby increasing volatile memory usage. In other cases, performing the single-die access operation to read the data in the programmed order may additionally or alternatively increase the reading latency, among other drawbacks. For example, differences in a time to sense a portion of the data from a respective destination data block and a time to transfer the portion of the data to the volatile memory when performing the single-die access operation may result in inefficiencies and increased latency when compared to performing the multi-die access operation. Therefore, there is a desire to take advantage of the relatively higher reading speed and the relatively low volatile memory usage associated with reading the data according to a multi-die access operation, but the relatively low volatile memory usage associated with programming (e.g., or folding) the data according to a single-die access operation.

In accordance with examples as described herein, a memory system may perform a single-die access operation for programming data to source data block(s) of the memory system, then the memory system may reorder the data during folding to destination data block(s) of the memory system such that a multi-die access operation may be performed to read the data from the destination data blocks (e.g., to a host system coupled with the memory system). For example, data may be programmed to the source data blocks in a first order according to the single-die access operation. The memory system may modify a folding order of the data such that the data may be folded to the destination data blocks in a second order (e.g., according to the single-die access operation) that supports sequentially reading the data from the destination data blocks according to the multi-die access operation. As a result, parallel reading such that the data may be sequentially read across the memory dies of the memory system at a relatively high speed and with relatively low volatile memory usage may be supported. Thus, programming the data to the source data blocks in the first order and folding the data to the destination data blocks in the second order may support the relatively low volatile memory usage associated with programming and folding the data according to the single-die access operation, and support the relatively high reading speed and relatively low volatile memory usage associated with reading the data according to the multi-die access operation, among other advantages.

Features of the disclosure are initially described in the context of systems, devices, and circuits with reference to FIG. 1. Features of the disclosure are described in the context of data transfer diagrams, order diagrams, channel read diagrams, and process flows with reference to FIGS. 2A through 4. These and other features of the disclosure are further illustrated by and described in the context of an apparatus diagram and flowchart that relate to folding operations for improved sequential read performance with reference to FIGS. 5 through 6.

FIG. 1 illustrates an example of a system 100 that supports folding operations for improved sequential read performance in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IOT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally, or alternatively, include static random access memory (SRAM) or other memory that may be used by the memory system controller 115 for internal storage or calculations, for example, related to the functions ascribed herein to the memory system controller 115. Additionally, or alternatively, the local memory 120) may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

A memory device 130 may include one or more arrays of non-volatile memory cells. For example, a memory device 130 may include NAND (e.g., NAND flash) memory. ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EE-PROM), or any combination thereof. Additionally, or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-*a* may include a local controller 135-*a* and a memory device 130-*b* may include a local controller 135-*b*.

In some cases, a memory device 130 may be or include a NAND device (e.g., NAND flash device). A memory device 130 may be or include a die 160 (e.g., a memory die). For example, in some cases, a memory device 130 may be a package (e.g., chip) that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single-level cells (SLCs). Additionally, or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may be performed on different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-*a*, 170-*b*, 170-*c*, and 170-*d* that are within planes 165-*a*, 165-*b*, 165-*c*, and 165-*d*, respectively, and blocks 170-*a*, 170-*b*, 170-*c*, and 170-*d* may be collectively referred to as a virtual block 180. In some cases, a virtual block may include blocks 170 from different memory devices 130 (e.g., including blocks in one or more planes of memory device 130-*a* and memory device 130-*b*). In some cases, the blocks 170 within a virtual block may have the same block address within their respective planes 165 (e.g., block 170-*a* may be "block 0" of plane 165-*a*, block 170-*b* may be "block 0" of plane 165-*b*, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages of the new block 170. The memory device 130 (e.g., the local controller 135) or the memory system controller 115 may mark or otherwise designate the data that remains in the old block 170 as invalid or obsolete and may update a logical-to-physical (L2P) mapping table to associate the logical address (e.g., LBA) for the data with the new, valid block 170 rather than the old, invalid block 170. In some cases, such copying and remapping may be performed instead of erasing and rewriting the entire old block 170 due to latency or wearout considerations, for example. In some cases, one or more copies of an L2P mapping table may be stored within the memory cells of the memory device 130 (e.g., within one or more blocks 170 or planes 165) for use (e.g., reference and updating) by the local controller 135 or memory system controller 115.

In some cases, L2P mapping tables may be maintained and data may be marked as valid or invalid at the page level of granularity, and a page 175 may contain valid data, invalid data, or no data. Invalid data may be data that is outdated due to a more recent or updated version of the data being stored in a different page 175 of the memory device 130. Invalid data may have been previously programmed to the invalid page 175 but may no longer be associated with a valid logical address, such as a logical address referenced by the host system 105. Valid data may be the most recent version of such data being stored on the memory device 130. A page 175 that includes no data may be a page 175 that has not been written to or that has been erased.

The system 100 may include any quantity of non-transitory computer readable media that support folding operations for improved sequential read performance. For example, the host system 105 (e.g., a host system controller 106), the memory system 110 (e.g., a memory system controller 115), or a memory device 130 (e.g., a local controller 135) may include or otherwise may access one or more non-transitory computer readable media storing instructions (e.g., firmware, logic, code) for performing the functions ascribed herein to the host system 105, the memory system 110, or a memory device 130. For example, such instructions, if executed by the host system 105 (e.g., by a host system controller 106), by the memory system 110 (e.g., by a memory system controller 115), or by a memory device 130 (e.g., by a local controller 135), may cause the host system 105, the memory system 110, or the memory device 130 to perform associated functions as described herein.

In accordance with examples described here, the memory system 110 may support folding operations (e.g., data transfer operations) that enable single-die programming and multi-die reading. For example, the memory system 110 may perform single-die access operations to program data to a set of source data blocks (e.g., blocks 170, virtual blocks 180, a virtual block 180 that spans the planes 165 of multiple dies 160 or memory devices 130) of the memory system 110. The memory system 110 may then reorder the data during folding to a set of destination data blocks of the memory system 110 such that a multi-die access operation may be performed to read the data from the destination data blocks (e.g., to a host system coupled with the memory system). For example, data may be programmed to the source data blocks in a first order according to the single-die access operation, and the data may be folded to the destination data blocks in a second order according to the single-die access operation. The second order may be based on a third order associated with sequentially reading the data as part of a multi-die access operation. Reading the data in the third order according to the multi-die access operation may support parallel reading, such that the data may be sequentially read across the memory dies of the memory system at a relatively high speed and with relatively low volatile memory usage. Thus, programming the data to the source data blocks in the first order and folding the data to the destination data blocks in the second order may support the relatively low volatile memory usage associated with programming and folding) the data according to the single-die access operation, and support the relatively high reading speed and relatively low volatile memory usage associated with reading the data according to the multi-die access operation.

Figure 2A:
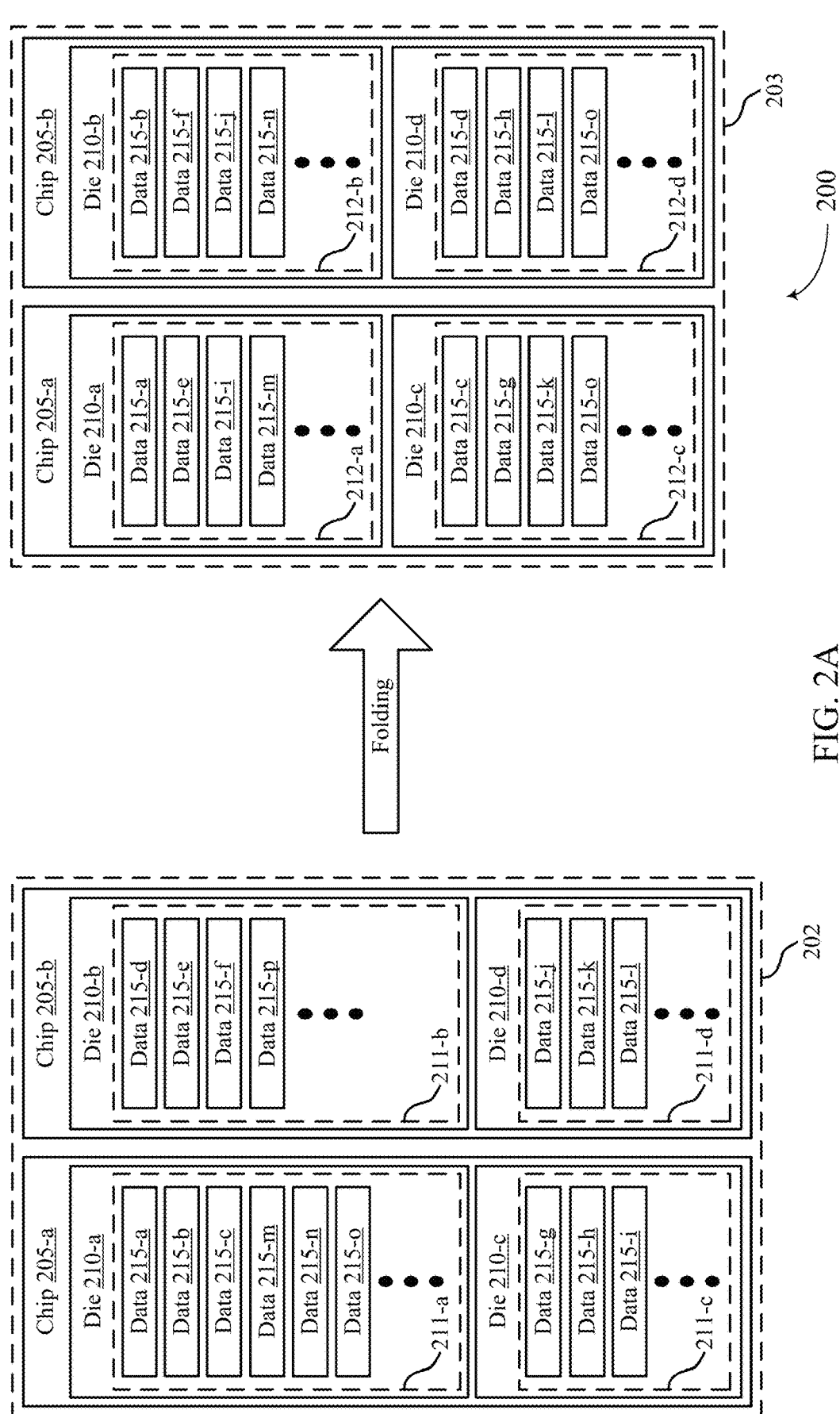
FIGS. 2A and 2B illustrate examples of a data transfer diagram and an order diagram, respectively, that support folding operations for improved sequential read performance in accordance with examples as disclosed herein.
Figure 2B:
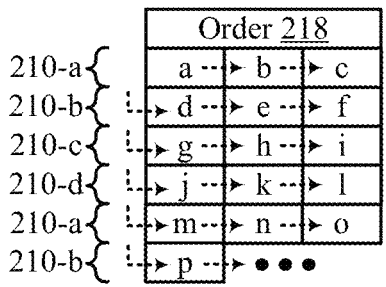
Figure 2B:
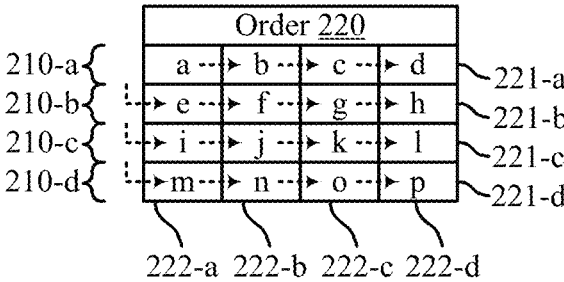
Figure 2B:
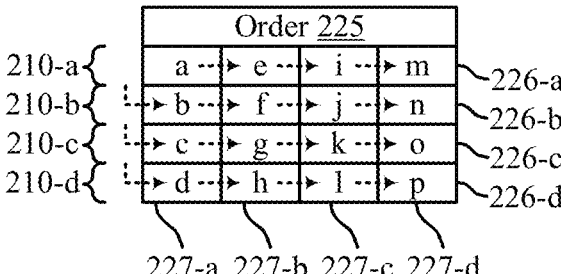
Figure 2B:
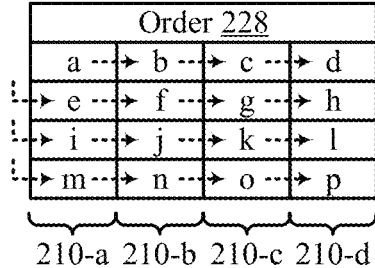

FIGS. 2A and 2B illustrate an example of a data transfer diagram 200 and an order diagram 201, respectively, that support folding operations for improved sequential read performance in accordance with examples as disclosed herein. The data transfer diagram 200 may illustrate operations of one or more components of a system 100, as described with reference to FIG. 1. For example, the data transfer diagram 200 and the order diagram 201 may illustrate folding data 215 between blocks of a memory system based on a sequential read order, where the memory system may be an example of a memory system 110, as described with reference to FIG. 1. In some cases, the memory system may be configured to support performing single-die access operations to transfer (e.g., fold) the data 215 operation from source data blocks 211 to destination data blocks 212, such that the data 215 may be sequentially read from the destination data blocks 212 as part of a multi-die access operation.

The data transfer diagram 200 illustrates chips 205 (e.g., memory chips), which may be respective examples of a memory device 130, as described with reference to FIG. 1. For example, the data transfer diagram 200 illustrates the chips 205-*a* and 205-*b* (e.g., and their respective components) before a transfer (e.g., folding) operation (e.g., at a time 202) and after the transfer operation (e.g., at a time 203 subsequent to the time 202). The chips 205 may include any quantity of dies 210, which may be referred to as memory dies. In the example of FIGS. 2A and/or 2B, the chip 205-*a* may include dies 210-*a* and 210-*c*, and the chip 205-*b* may include dies 210-*b* and 210-*d*, which may be examples of dies 160, as described with reference to FIG. 1.

The dies 210 may each include any quantity of source data blocks 211 (e.g., source data block 211-*a*, 211-*b*, 211-*c*, and 211-*d*) and any quantity of destination data blocks 212 (e.g., destination data block 212-*a*, 212-*b*, 212-*c*, and 212-*d*). The source data blocks 211 may be associated with initially storing data 215 (e.g., programmed from a host system or previously folded to the source data blocks, at time 202), and the destination data blocks 212 may be associated with storing the data 215 after transferring (e.g., folding) the data 215 from the source data blocks 211 (e.g., at time 203). Each source data block 211 and destination data block 212 may store the data 215 in one or more pages of the respective block (e.g., pages 175). For example, pages of the source data blocks 211 may include SLCs, MLCs, TLCs (e.g., as illustrated in the data transfer diagram 200), QLCs, or a combination thereof; and pages of the destination data blocks 212 may include QLCs.

In some cases, the source data blocks 211 and the destination data blocks 212 may be examples of data blocks, or virtual blocks, associated with (e.g., spanning) one or more of the dies 210. For example, in the example of FIG. 2A, each source data block 211 may be a source virtual block and each destination data block 212 may be a destination virtual block, which may be respective examples of a virtual block 180, as described with reference to FIG. 1. Alternatively, a source data block 211 and a destination data block 212 may be associated with multiple dies 210. For example, a single source data block 211 and a single destination data block 212 may be virtual blocks including blocks from multiple dies 210 (e.g., blocks having the same block address within respective planes of multiple dies 210). Here, the source data blocks 211-*a* through 211-*d* may collectively constitute the single source data block 211, and the destination data blocks 212-*a* through 212-*d* may collectively constitute the single destination data block 212.

The data 215 may be programmed (e.g., written, stored) to the source data blocks 211 according to an order 218 (e.g., a sequential order) as part of respective single-die access operations. For example, according to the order 218, data 215-*a*. 215-*b*, and 215-*c* may be sequentially (e.g., alphabetically as illustrated) programmed to the source data block 211-*a* of the die 210-*a* as part of a first single-die access operation: data 215-*d*. 215-*e*, and 215-*f* may be sequentially programmed to source data block 211-*b* of die 210-*b* as part of a second single-die access operation after the first single-die access operation: data 215-*g*. 215-*h*, and 215-*i* may be sequentially programmed to source data block 211-*c* of die 210-*c* as part of a third single-die access operation after the second single-die access operation: and data 215-*j*. 215-*k*, and 215-*l* may be sequentially programmed to source data block 211-*d* of die 210-*d* as part of a fourth single-die access operation after the third single-die access operation. That is, each die 210 may be programmed as part of a respective single-die access operation before programming the data 215 to a subsequent (e.g., alphabetical) die 210. Further, after data 215-*l* is programed to the source data block 211-*d*, programming for additional data 215 may return to die 210-*a*, in which data 215-*m*, 215-*n*, and 215-*o* may be sequentially programmed to the source data block 211-*a* (e.g., or another source data block 211 of the die 210-*a*) as part of a respective single-die access operation, data 215-*p* may be programmed to the source data block 211-*b*, and so on. In some examples, each portion of data 215 (e.g., data

215-*a*) may be programmed to a respective page of the respective source data block 211 (e.g., source data block 211-*a*).

The data 215 may be sequentially read (e.g., sensed) from the destination data blocks 212 according to an order 228 as part of a multi-die access operation, after the data 215 is transferred (e.g., folded) from the source data blocks 211 to the destination data blocks 212. According to the order 228, data 215 may be sequentially read from the respective destination data blocks as part of the multi-die access operation, such that the dies 210 may be accessed concurrently while reading the data 215. For example, the memory system may sequentially read the data 215-*a*. 215-*b*, 215-*c*, and 215-*d* from across the destination data blocks 212-*a*. 212-*b*. 212-*c*, and 212-*d*, respectively. Further, after data 215-*d* is read from the destination data block 212-*d*, the memory system may return to the destination data block 212-*a* to read the data 215-*e*, and so on (e.g., cyclically reading across the dies 210). In some examples, each portion of data 215 (e.g., data 215-*a*) may be read from a page of the respective destination data block 212 (e.g., destination data block 212-*a*).

In some cases, reading the data 215 from the destination data blocks 212 may include transferring the data to a volatile memory device (not shown) of the memory system, such as to a memory system controller 115 (e.g., a local memory 120, SRAM). That is, the memory system may transfer the data 215 to the volatile memory device and may transmit (e.g., transfer) the data from the volatile memory device to the host system. In such cases, one or more channels between the volatile memory device and the chips 205 (not shown), such as channels 305 described with reference to FIG. 3A and/or FIG. 3B, may be used to transfer the data 215 from each chip 205 to the volatile memory device. For example, the data 215 from destination data blocks 212-*a* and 212-*c* may be transferred via a first channel, and the data 215 from destination data blocks 212-*b* and 212-*d* may be transferred via a second channel. Data 215 may be transferred via the first and second channels concurrently.

The data 215 may be transferred (e.g., folded) from the source data blocks 211 to the destination data blocks 212 according to an order 225 as part of respective single-die access operations, to support reading the data 215 from the destination data blocks 212 according to the order 228 as part of the multi-die access operation. The memory system may generate the order 225 for transferring the data 215 based on an order 220, where the order 220 may be based on the order 218 in which the data 215 is sequentially programmed to the source data blocks 211.

For example, the memory system may access L2P information (e.g., an L2P mapping table, a mapping between logical addresses of the data 215 and physical addresses of the data 215 within the source data blocks 211) to determine the order 218 (e.g., to determine the locations of the valid data 215 within the source data blocks 211). In some examples, the memory system may generate the order 220 based on the order 218. For example, the order 220 may be an order for folding the data 215 in which the data 215 may be sequentially programmed to the dies 210 using single-die access operations. Each row 221 of the order 220 may correspond to the data 215 that is to be transferred to a respective die 210. In accordance with single-die access operations, each row 221 of data 215 (e.g., rows 221-*a*, 221-*b*, 221-*c*, and 22-*d*) may be programmed to a respective die 210 before a next row 221 of data 215 is programmed to a next die 210. In some cases, the order 220 may be based on a quantity of portions of the data 215 to be transferred to each destination data block 212. For example, a quantity of columns 222 (e.g., four columns 222, columns 222-*a*, 222-*b*, 222-*c*, and 222-*d*) of the order 220 may correspond to the quantity of portions of the data 215 to be transferred to each destination data block 212 as part of a respective single-die access operation.

If folded according to the order 220, the data 215 may be sequentially programmed to the dies 210 (e.g., the destination data blocks 212), however, such folding may result in non-sequential transferring of the data as part of a multi-die read operation as described with reference to FIG. 3A.

To support sequential transferring of the data 215 as part of the multi-die read operation, the memory system may modify the order 220 (e.g., or the order 218) based on the order 228 to generate the order 225. For example, the memory system may modify the order 220 such that programming each row 226 of data 215 (e.g., rows 226-*a*, 226-*b*, 226-*c*, and 226-*d*) to respective dies 210 in accordance with single-die access operations results in reading the data 215 from the respective dies according to the order 228 in accordance with a multi-die access operation. In some cases, generating the order 225 may include transposing the order 220. For example, memory system may generate the order 225 by transposing the order 220 such that the portions of the data 215 in the rows 221 of the order 220 may correspond to the portions of the data 215 in the columns 227 (e.g., columns 227-*a*, 227-*b*, 227-*c*, and 227-*d*) of the order 225 (e.g., and the columns 222 may correspond to rows 226).

The data 215 may be transferred from the source data blocks 211 to the destination data blocks 212 according to the order 225 as part of respective single-die access operations. In some cases, transferring the data 215 to the destination data blocks 212 may include folding the data 215, where the data 215 from the source data blocks 211 may be compiled (e.g., selected, read) according to a data storage capability of the destination data blocks 212 (e.g., SLC to QLC folding, TLC to QLC folding, QLC to QLC folding). Folding the data 215 to the destination data blocks 212 may include transferring (e.g., sensing, reading) the data 215 from the source data blocks 211 to the volatile memory device (e.g., SRAM) according to the order 225, and subsequently transferring (e.g., writing, programming) the data 215 from the volatile memory device to the destination data blocks 212 according to the order 225. For example, the data 215-*a*, 215-*e*, 215-*i*, and 215-*m* may be folded (e.g., via the volatile memory device) from the respective source data blocks 211 to the destination data block 212-*a*, then the data 215-*b*, 215-*f*, 215-*j*, and 215-*n* may be folded from the respective source data blocks 211 to the destination data block 212-*b* (e.g., and so forth according to the order 225) as part of respective single-die access operations to write the data 215 to the destination data blocks 212.

In some cases, the memory system may finish writing a row 226 (e.g., 226-*a*) of the data 215 to the respective destination data block 212 before sensing a subsequent row 226 (e.g., 226-*b*) of the data 215 from the respective source data blocks 211, such that the data 215 is written to one destination data block 212 at a time. In other cases, the memory system may finish writing a portion of the data 215 (e.g., 215-*a*) to the respective destination data block 212 before sensing a subsequent portion of the data 215 (e.g., 215-*e*) from the respective source data block 211, such that one portion of the data 215 is transferred at a time via the volatile memory device (e.g., to reduce volatile memory device usage, for example, due to a relatively low storage capacity of the volatile memory device).

Programming and transferring the data 215 as part of single-die access operations and reading the data 215 as part of a multi-die access operation may be associated with relatively low volatile memory usage. Further, reading the data 215 with the multi-die access operation may support parallel reading, such that the data 215 may be read sequentially across the dies 210 at a relatively high speed (e.g., satisfying a UFS interface maximum speed limit, such as a 2100 megabyte per second (MB/s) UFS 3.1 interface maximum speed limit). Thus, programming the data 215 to the source data blocks 211 according to the order 218 and transferring the data 215 to the destination data blocks according to the order 225 may support the relatively low volatile memory usage associated with programming and transferring the data 215 according to the single-die access operation, and support the relatively high reading speed and relatively low volatile memory usage associated with reading the data 215 in the order 228 according to the multi-die access operation.

Figure 3A:
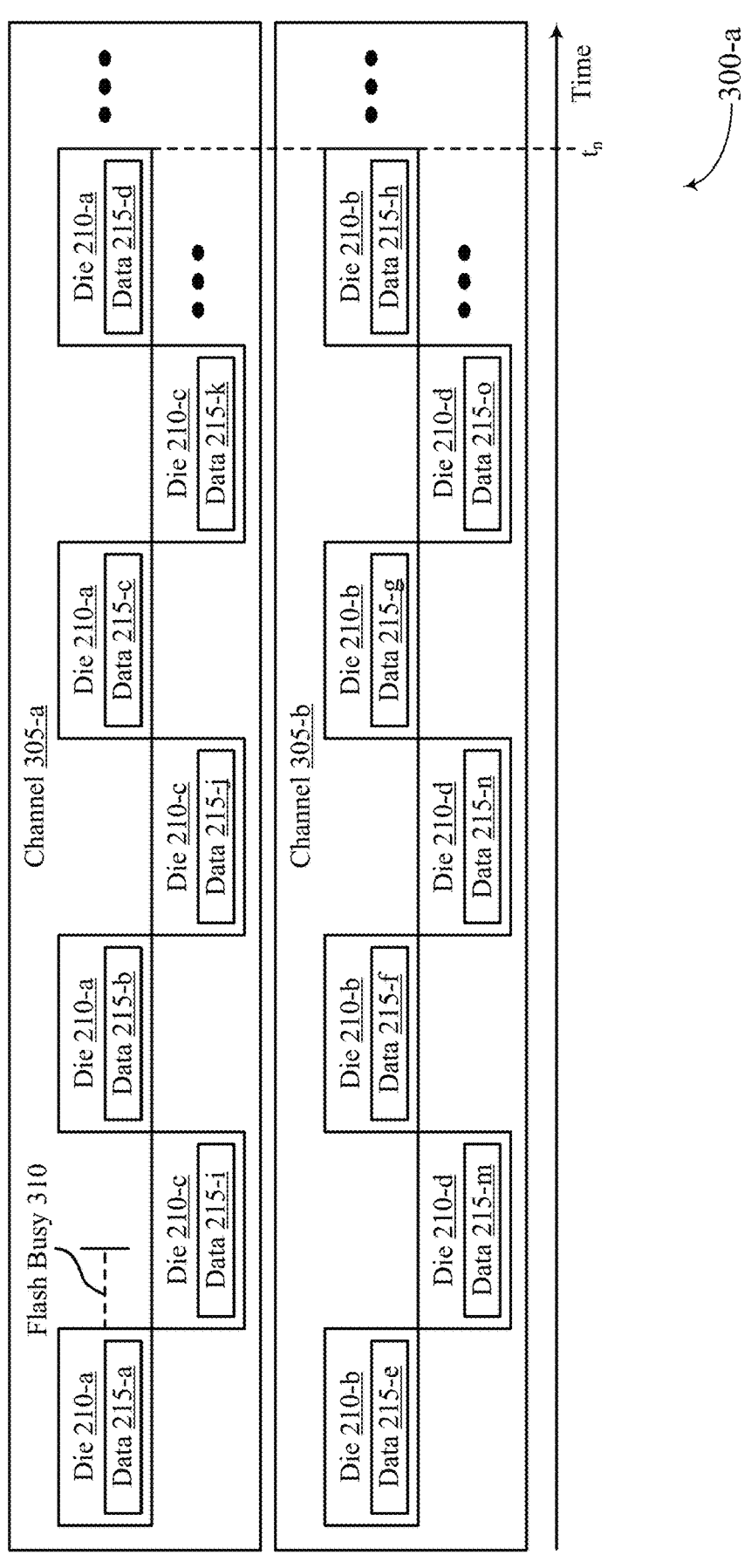
FIGS. 3A and 3B illustrate examples of channel read diagrams that support folding operations for improved sequential read performance in accordance with examples as disclosed herein.
Figure 3B:
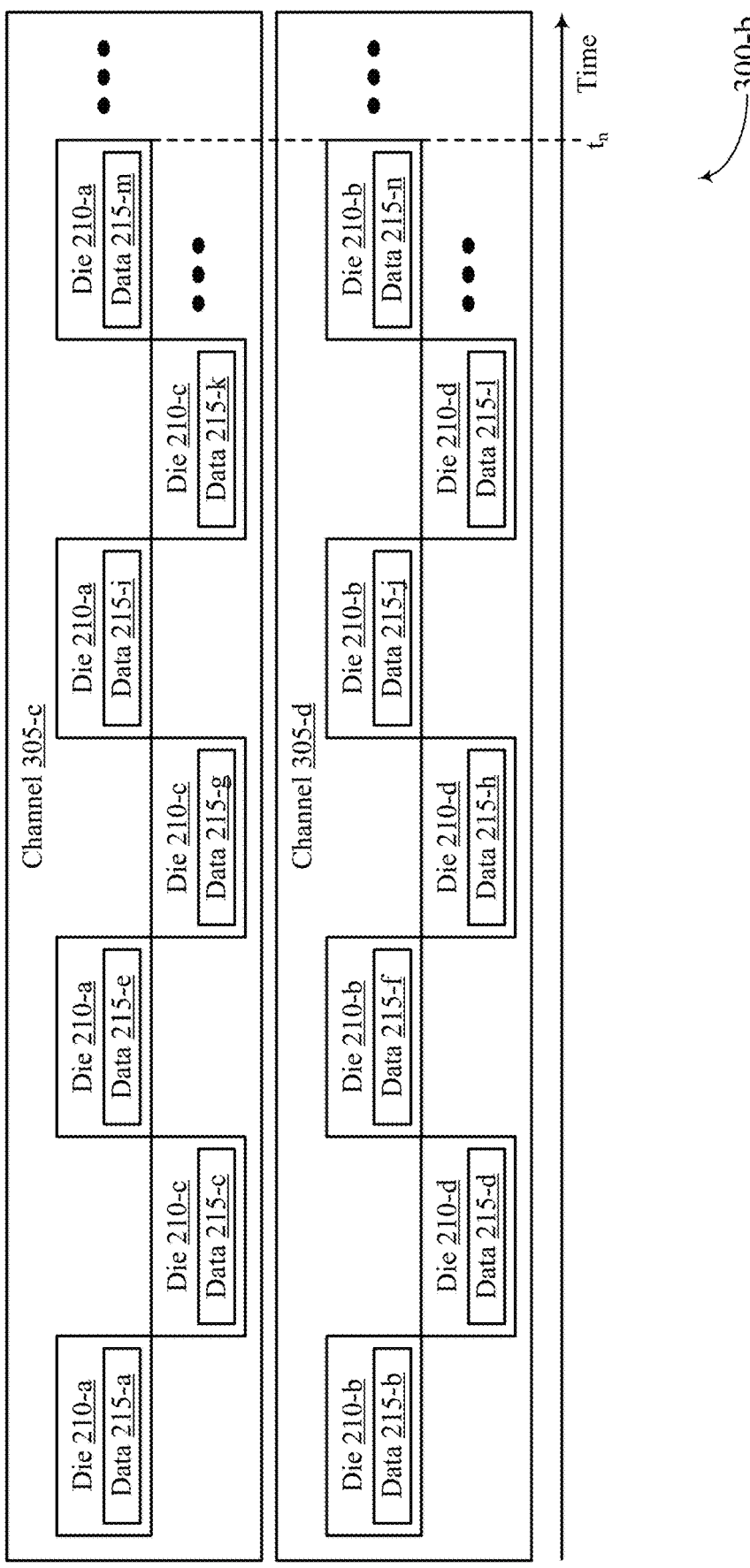

FIGS. 3A and 3B illustrate examples of channel read diagrams 300-*a* and 300-*b* that support folding operations for improved sequential read performance in accordance with examples as disclosed herein. The channel read diagrams 300-*a* and 300-*b* may illustrate operations of one or more components of a system 100 or data transfer diagram 200, as described with reference to FIGS. 1 and 2, respectively. Specifically, the channel read diagrams 300-*a* and 300-*b* may illustrate reading the data 215 from the dies 210 (e.g., to a volatile memory device of a memory system for subsequent transmission to a host system) over channels 305. The channel read diagram 300-*a* may illustrate reading the data 215 from the dies 210, where the data 215 was transferred from the source data blocks 211 to the destination data blocks 212 according to the order 220. The channel read diagram 300-*b* may illustrate reading the data 215 from the dies 210, where the data 215 was transferred from the source data blocks 211 to the destination data blocks 212 according to the order 225.

The channel read diagram 300-*a* and 300-*b* illustrate channels 305 which may each be coupled with a chip 205 of the memory system. Each channel may be configured to communicate the data 215 between the dies 210 of a respective chip 205 and a volatile memory device. For example, the memory system may transfer the data 215 from destination data blocks 212-*a* and 212-*c* of the dies 210-*a* and 210-*c*, respectively, to the volatile memory device via a channel 305-*a* (e.g., a channel 305-*c*). Additionally, the memory system may transfer the data 215 from the destination data blocks 212-*b* and 212-*d* of the dies 210-*b* and 210-*d*, respectively, to the volatile memory device via a channel 305-*b* (e.g., a channel 305-*d*). In some cases, transferring the data 215 may include sensing the data 215 (e.g., to internal latches of the chips 205) and then transferring the data 215 to the volatile memory device via a respective channel 305. The data 215 may then be transmitted from the volatile memory device to the host system. In some examples, sensing the data 215 from a die 210 may be associated with a first duration (e.g., a QLC sense duration, such as 89 µs) and transferring the data to the volatile memory device via a channel 305 may be associated with a second duration (e.g., a direct memory access (DMA) transfer duration, such as 52.8 µs) that is less than the first duration.

The channel read diagram 300-*a* and 300-*b* may illustrate sequentially transferring (e.g., reading) the data 215 from the destination data blocks 212 to the volatile memory device over the channels 305 as part of a multi-die access operation (e.g., a multi-die read operation), such that parallel transfer may be implemented for each channel 305 (e.g., parallel reading of the dies 210 coupled with a respective channel 305). For example, in cases where a multi-die access operation is performed, the data 215 from the die 210-*c* may be transmitted via the channel 305-*a* after transferring the data 215 from the prior die 210-*a*, for example, due to being able to sense the data 215 from the die 210-*c* while transferring the data 215 from die 210-*a*. Thus, the data 215 from the die 210-*c* may be immediately transferred after finishing transferring the data 215 from the die 210-*a*.

However, if a single-die access operation was performed to sequentially read the data, the data 215 from a single die 210 may be transferred via the channel 305 (e.g., data 215-*a* through 215-*d* may be transferred to the volatile memory device before data 215 from the die 210-*c* is transferred to the volatile memory device). Because the first duration for sensing the data 215 is greater than the second duration for transferring the data 215, a flash busy 310 period may occur, in which no data 215 is communicated via the channel 305 due to subsequent data 215 (e.g., data 215-*b*) not yet being sensed from the destination data block. For example, after the data 215-*a* is sensed from the die 210-*a*, the data 215-*a* may be transferred concurrent with sensing the data 215-*b* from the die 210. But, due to the first duration for sensing the data 215-*b* being greater than the second duration for transferring the data 215-*a*, the memory system may wait (e.g., for a time interval equivalent to the difference between the first duration and the second duration corresponding to the flash busy 310) to begin transferring the data 215-*b* via the channel 305-*a* until after the data 215-*b* is sensed, thereby decreasing an efficiency of the channel 305-*a*. Therefore, sequentially reading the data according to the single-die access operation may be associated with transmitting relatively less data in a given time than sequentially reading the data according to the multi-die access operation, thereby reducing the speed of the data transfer.

The channel read diagram 300-*a* may illustrate sequentially reading the data 215 as part of a multi-die access operation, where the data 215 was folded to the destination data blocks 212 according to the order 220. For example, the channel read diagram 300-*a* illustrates a sequential read operation when the data 215-*a*, 215-*b*, 215-*c*, and 215-*d* were folded to the destination data block 212-*a* of the die 210-*a*. However, sequentially reading the data 215 folded according to the order 220 may be associated with relatively higher volatile memory usage (e.g., than reading the data 215 folded according to the order 225). In some cases, the host system may not accept (e.g., may be unable to properly decode) the data 215 if transmitted in a non-sequential order, yet reading the data 215 folded according to the order 220) may cause the data 215 to be transferred to the host system in a non-sequential order. In such cases, the memory system may reorder the data 215 using the volatile memory device before transmitting the data 215 to the host system. As a result, the memory system may retain relatively more data 215 (e.g., twice the quantity of data 215 than otherwise) in the volatile memory device and for longer time intervals before transmitting the data 215 to the host system. For example, reading the data 215, as illustrated in the channel read diagram 300-*a*, may include reading, in order, the data 215-*a*, 215-*e*, 215-*i*, 215-*m*, 215-*b*, 215-*f*, 215-*j*, 215-*n*, 215-*c*, 215-*g*. 215-*k*, 215-*o*, 215-*d*. 215-*h*, and so forth. In such examples, the volatile memory device may store the data 215-*e*, 215-*i*, and 215-*m* until the data 215-*b* is read.

Therefore, the volatile memory device may store more data 215 than if the data was read in sequential order, otherwise associated with reading the data 215 folded using the order 225.

The channel read diagram 300-*b* may illustrate sequentially reading the data 215 as part of a multi-die access operation, where the data 215 was folded to the destination data blocks 212 according to the order 225. For example, the channel read diagram 300-*b* illustrates a sequential read operation when the data 215-*a*. 215-*e*, 215-*i*, and 215-*m* were folded to the destination data block 212-*a* of the die 210-*a*, the data 215-*b*, 215-*f*, 215-*j*, and 215-*n*, were folded to the destination data blocks 212-*b* of the die 210-*b*, and so on. Sequentially reading the data 215 folded according to the order 225 may be associated with relatively less volatile memory usage and reduced read latency (e.g., than reading the data 215 folded according to the order 220). In some cases, reading the data 215 folded according to the order 225 may cause the data 215 to be transferred to the host system in a sequential order, thereby satisfying constraints of the host system (e.g., satisfying a UFS interface maximum speed limit). In such cases, the memory system may not reorder the data 215 using the volatile memory device before transmitting the data 215 to the host system due to transferring the data 215 to the volatile memory device in the sequential order. As a result, the memory system may retain relatively less data 215 in the volatile memory device and for shorter time intervals before transmitting the data 215 to the host system. For example, reading the data 215, as illustrated in the channel read diagram 300-*b*, may include reading, in order, the data 215-*a*. 215-*b*. 215-*c*. 215-*d*, 215-*e*, 215-*f*, 215-*g*. 215-*h*, 215-*i*, 215-*j*, 215-*k*, 215-*l*, 215-*m*, 215-*n*, and so forth. In such examples, the volatile memory device may not store any portions of the data 215 until other portions of the data 215 are read. That is, the memory system may transmit the data 215 to the host system after the data 215 is transferred to the volatile memory device without having to wait for other data 215 to be transferred to the volatile memory device. Therefore, the volatile memory device may store less data 215 than if the data was read in the non-sequential order, otherwise associated with reading the data 215 folded according to the order 220. In some cases, reading the data 215 folded according to the order 225 may be associated with a relatively higher data transfer speed (e.g., 1241 MB/s per channel 305 for a total data transfer speed of up to 2482 MB/s without consideration of overhead). Additionally, even assuming firmware latency and hardware overhead (e.g., 8% speed decrease), the relatively higher data transfer speed may still be associated with greater data transfer speed than a UFS 3.1 maximum interface speed limit (e.g., 2284 MB/s with 8% overhead is greater than 2100 MB/s maximum interface speed limit).

Figure 4:
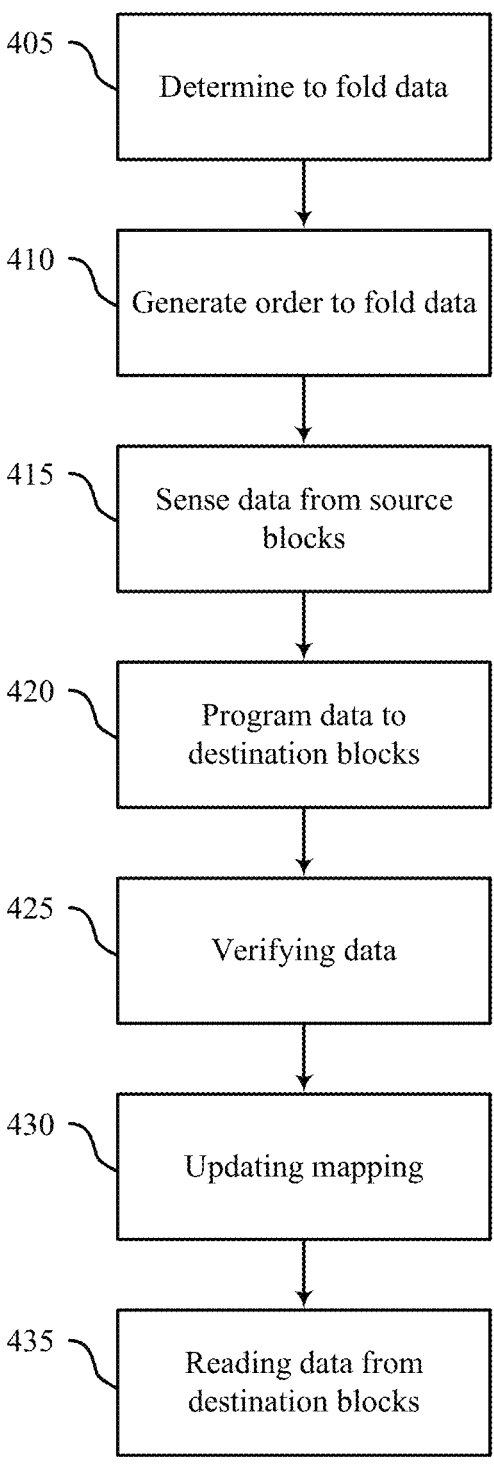
FIG. 4 illustrates an example of a process flow that supports folding operations for improved sequential read performance in accordance with examples as disclosed herein.

FIG. 4 illustrates an example of a process flow 400 that supports folding operations for improved sequential read performance in accordance with examples as disclosed herein. The process flow 400 may illustrate aspects or operations of a system 100 or a data transfer diagram 200, as described with reference to FIGS. 1 and 2, respectively. For example, the process flow 400 may be implemented by a memory system as described herein, including with reference to FIGS. 1 through 3. In the following description of the process flow 400, the methods, techniques, processes, and operations may be performed in different orders or at different times. Further, certain operations may be left out of the process flow 400, or other operations may be added to the process flow 400. Additionally, although operations may be shown to occur at different times for discussion purposes, these operations may actually occur at the same time.

Aspects of the process flow 400 may be implemented by a controller of a memory system, among other components, or implemented as instructions stored in memory (e.g., firmware stored in a memory coupled with the memory system or a host system). For example, the instructions, when executed by a controller (e.g., the memory system or host system), may cause the controller to perform the operations of the process flow 400. The operations described herein may support transferring (e.g., folding) data according to a single-die access operation from source data blocks of a memory system to destination data blocks of the memory system in a folding order such that the data may be sequentially read from the destination data blocks according to a multi-die access operation.

At 405, the memory system may determine to fold the data from the source data blocks to the destination data blocks. In some cases, the memory system may determine to fold the data based on receiving a command from the host system, or based on a periodic or aperiodic basis (e.g., as part of a background operation of the memory system). In some examples, the memory system may select the source data blocks associated with storing the data for a folding operation. Based on (e.g., in response to, after) determining to fold the data, the memory system may allocate at least a portion of a volatile memory device of the memory system to temporarily store the data from the source data blocks during the folding operation (e.g., based on a quantity of the data determined to be folded).

At 410, the memory system may generate the folding order (e.g., a first order, the order 225) for folding the data. For example, the memory system may generate the folding order based on a read order (e.g., a second order, the order 228) according to which the data may be sequentially read from the destination data blocks, which may be different from a programmed order (e.g., a third order, the order 218) in which the data was programmed to the source data blocks. The folding order may also be different from a second folding order (e.g., a fourth order, the order 220) that is a folding order corresponding to a sequential programming of the destination data blocks but according to which a multi-die read would result in non-sequentially read data from the destination data blocks.

In some cases, the programmed order may be determined based on L2P information (e.g., a mapping between logical addresses and physical addresses of the data) and modified based on the read order to generate the order for folding the data. For example, the memory system may access (e.g., retrieve) the L2P information to determine the programmed order (e.g., to determine which source data blocks store which portions of the data). The memory system may modify (e.g., reorder) the programmed order based on the read order to generate the folding order. For example, the memory system may modify the programmed order such that transferring the data according to modified programmed order (e.g., the folding order) according to single-die access operations supports sequentially reading the data according to the read order.

In some examples, the order for folding the data may be generated based on transposing the second folding order (e.g., according to a storage density of the source data blocks). For example, the memory system may use the L2P information to determine the programmed order and generate the second folding order based on the programmed order.

To generate the folding order (e.g., the order 225), the memory system may transpose the second folding order (e.g., the order 220).

At 415, the memory system may sense (e.g., read) the data from the source data blocks according to the single-die access operation. The data may be sensed from the source data blocks according to the folding order, and the data may be transferred to the volatile memory device for temporary storage.

At 420, the memory system may program (e.g., write) the data from the volatile memory device to the destination data blocks as part of respective single-die access operations. The data may be programmed to the destination data blocks according to the folding order (e.g., according to the order in which the data was sensed). In some cases, the data may be sensed and programmed page by page, such that the data from a page of the source data blocks may be programmed to a page of the destination data blocks before sensing the data from a subsequent page (e.g., according to the order). In some cases, a portion (e.g., a first portion) of the data may be sensed from a source virtual block and programmed to a memory die (e.g., a first memory die) associated with a destination virtual block, and another portion (e.g., a second portion) of the data may be sensed from the source virtual block and programmed to another memory die (e.g., a second memory die) associated with the destination virtual block.

At 425, the memory system may verify the data in the destination data blocks. For example, the memory system may perform an error detection operation to determine whether a quantity of errors in the data satisfies a threshold of allowable errors. In some cases, if the memory system determines the quantity of errors in the data does not satisfy the threshold of allowable errors, the memory system may perform an error correction operation or refold the data to the destination data blocks.

At 430, the memory system may update a mapping of the data. For example, the memory system may update the L2P information associated with the data such that the L2P information maps the logical addresses of the data to the physical addresses of the data in the destination data blocks.

At 435, the memory system may sequentially read the data from the destination data blocks as part of a multi-die access operation. In some cases, the data may be read (e.g., transferred) to the volatile memory device, and the volatile memory device may transmit the data to the host system. The data may be read according to the read order, such that the data may be transferred to the volatile memory device (e.g., and the host system) in sequential order. In some cases, the data may be sequentially read as described with reference to FIG. 3B. For example, the data may be transferred from the memory system to the host system over one or more channels, such as channels 305, as described with reference to FIG. 3B.

In some cases, folding the data according to the folding order while implementing single-die access operations and reading the data according to the read order while implementing multi-die access operations may be associated with relatively low volatile memory usage. Further, reading the data according to the multi-die access operation may support parallel reading, such that the data may be read sequentially across the memory dies at a relatively high speed. Thus, folding the data to the destination data blocks in the folding order may support the relatively low volatile memory usage associated with folding the data with the single-die access operation, and the relatively high reading speed and relatively low volatile memory usage associated with reading the data as part of the multi-die access operation.

Figure 5:
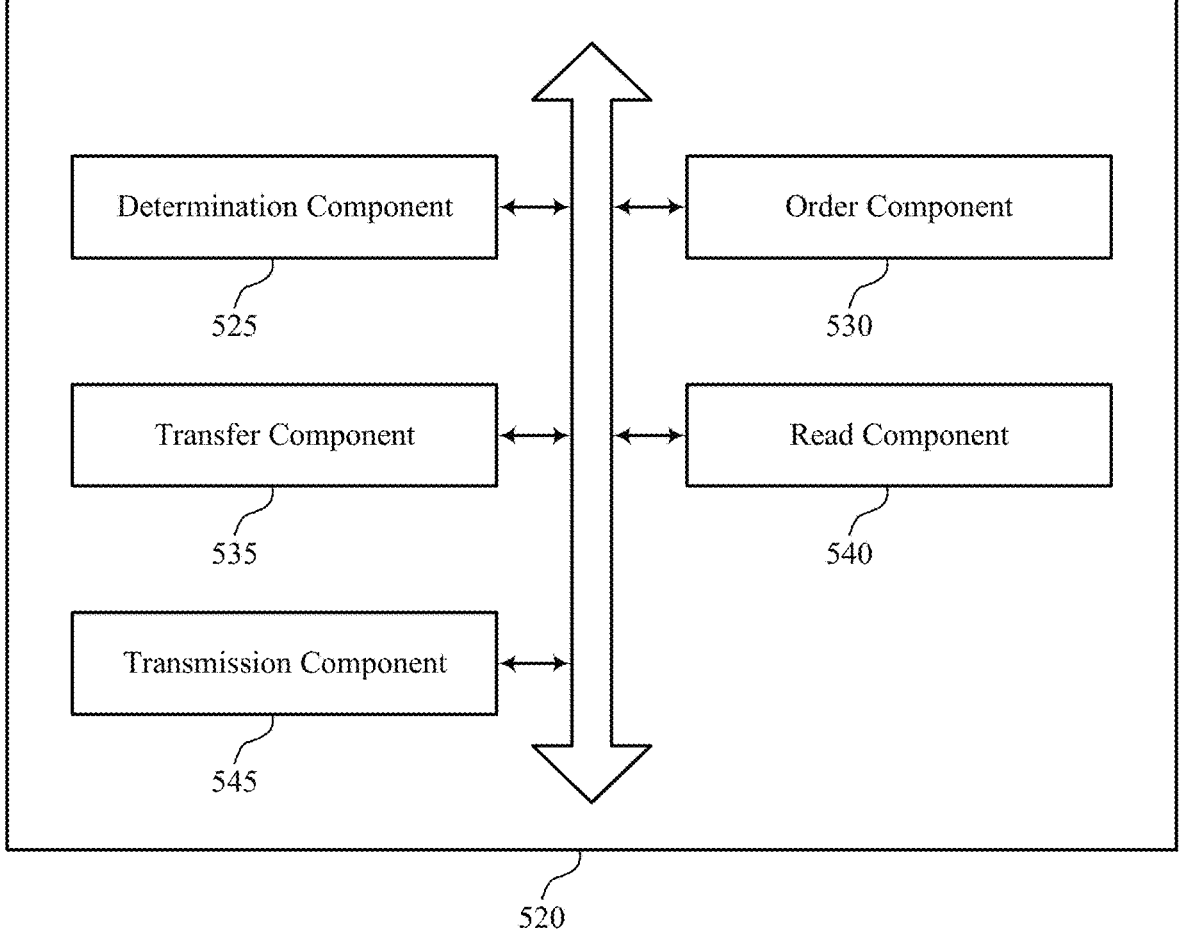
FIG. 5 illustrates a block diagram of a memory system that supports folding operations for improved sequential read performance in accordance with examples as disclosed herein.

FIG. 5 illustrates a block diagram 500 of a memory system 520 that supports folding operations for improved sequential read performance in accordance with examples as disclosed herein. The memory system 520 may be an example of aspects of a memory system as described with reference to FIGS. 1 through 4. The memory system 520, or various components thereof, may be an example of means for performing various aspects of folding operations for improved sequential read performance as described herein. For example, the memory system 520 may include a determination component 525, an order component 530, a transfer component 535, a read component 540), a transmission component 545, or any combination thereof. Each of these components may communicate, directly or indirectly, with one another (e.g., via one or more buses).

The determination component 525 may be configured as or otherwise support a means for determining to transfer data from a set of source data blocks of a memory system to a set of destination data blocks of the memory system. The order component 530 may be configured as or otherwise support a means for generating, based at least in part on determining to transfer the data, a first order for transferring respective portions of the data to the set of destination data blocks, the first order associated with a second order associated with a sequential read of the data from the set of destination data blocks and different than a third order according to which the data was written to the set of source data blocks. The transfer component 535 may be configured as or otherwise support a means for transferring the data from the set of source data blocks to the set of destination data blocks based at least in part on the first order.

In some examples, to support transferring the data, the transfer component 535 may be configured as or otherwise support a means for sensing the data from the set of source data blocks to a volatile memory device of the memory system according to the first order. In some examples, to support transferring the data, the transfer component 535 may be configured as or otherwise support a means for writing the data from the volatile memory device to the set of destination data blocks according to the first order based at least in part on sensing the data to the volatile memory device according to the first order.

In some examples, to support transferring the data, the transfer component 535 may be configured as or otherwise support a means for transferring a first portion of the data from the set of source data blocks to a first destination data block of the set of destination data blocks. In some examples, to support transferring the data, the transfer component 535 may be configured as or otherwise support a means for transferring, after transferring the first portion of the data, a second portion of the data from the set of source data blocks to a second destination data block of the set of destination data blocks.

In some examples, to support generating the first order, the order component 530 may be configured as or otherwise support a means for determining the third order based at least in part on a mapping between logical addresses of the data and physical addresses of the data within the set of source data blocks. In some examples, to support generating the first order, the order component 530 may be configured as or otherwise support a means for modifying the third order based at least in part on the second order to generate the first order.

In some examples, to support generating the first order, the order component 530 may be configured as or otherwise support a means for generating a fourth order for transferring respective portions of the data to the set of destination data blocks based at least in part on the third order. In some examples, to support generating the first order, the order component 530 may be configured as or otherwise support a means for generating the first order based at least in part on transposing the fourth order.

In some examples, the read component 540 may be configured as or otherwise support a means for sequentially reading the data from the set of destination data blocks according to the second order based at least in part on the transferring the data according to the first order. In some examples, the transmission component 545 may be configured as or otherwise support a means for transmitting the sequentially read data to a host system coupled with the memory system.

In some examples, to support sequentially reading the data, the transfer component 535 may be configured as or otherwise support a means for transferring, via a first channel, a first portion of the data according to the second order to a volatile memory device of the memory system for transmission to the host system. In some examples, to support sequentially reading the data, the transfer component 535 may be configured as or otherwise support a means for transferring, after or concurrent with transferring the first portion of the data via a second channel, a second portion of the data according to the second order to the volatile memory device for transmission to the host system. In some examples, to support sequentially reading the data, the transfer component 535 may be configured as or otherwise support a means for transferring, after or concurrent with transferring the second portion of the data via the first channel, a third portion of the data according to the second order to the volatile memory device for transmission to the host system.

In some examples, the set of source data blocks includes a source virtual block associated with a set of memory dies of the memory system. In some examples, the set of destination data blocks includes a destination virtual block associated with the set of memory dies of the memory system.

In some examples, to support transferring the data, the transfer component 535 may be configured as or otherwise support a means for transferring a first portion of the data from portions of the set of memory dies associated with the source virtual block to a portion of a first memory die associated with the destination virtual block. In some examples, to support transferring the data, the transfer component 535 may be configured as or otherwise support a means for transferring, after transferring the first portion of the data, a second portion of the data from portions of the set of memory dies associated with the source virtual block to a portion of a second memory die associated with the destination virtual block.

In some examples, each source data block of the set of source data blocks and each destination data block of the set of destination data blocks is associated with one or more virtual blocks of a respective memory die of the memory system.

In some examples, the set of source data blocks include SLCs, MLCs, TLCs, QLCs, or any combination thereof. In some examples, the set of destination data blocks include QLCs.

FIG. 6 illustrates a flowchart showing a method 600 that supports folding operations for improved sequential read performance in accordance with examples as disclosed herein. The operations of method 600 may be implemented by a memory system or its components as described herein.

For example, the operations of method 600 may be performed by a memory system as described with reference to FIGS. 1 through 5. In some examples, a memory system may execute a set of instructions to control the functional elements of the device to perform the described functions. Additionally, or alternatively, the memory system may perform aspects of the described functions using special-purpose hardware.

At 605, the method may include determining to transfer data from a set of source data blocks of a memory system to a set of destination data blocks of the memory system. The operations of 605 may be performed in accordance with examples as disclosed herein. In some examples, aspects of the operations of 605 may be performed by a determination component 525 as described with reference to FIG. 5.

At 610, the method may include generating, based at least in part on determining to transfer the data, a first order for transferring respective portions of the data to the set of destination data blocks, the first order associated with a second order associated with a sequential read of the data from the set of destination data blocks and different than a third order according to which the data was written to the set of source data blocks. The operations of 610 may be performed in accordance with examples as disclosed herein. In some examples, aspects of the operations of 610 may be performed by an order component 530 as described with reference to FIG. 5.

At 615, the method may include transferring the data from the set of source data blocks to the set of destination data blocks based at least in part on the first order. The operations of 615 may be performed in accordance with examples as disclosed herein. In some examples, aspects of the operations of 615 may be performed by a transfer component 535 as described with reference to FIG. 5.

In some examples, an apparatus as described herein may perform a method or methods, such as the method 600. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for determining to transfer data from a set of source data blocks of a memory system to a set of destination data blocks of the memory system: generating, based at least in part on determining to transfer the data, a first order for transferring respective portions of the data to the set of destination data blocks, the first order associated with a second order associated with a sequential read of the data from the set of destination data blocks and different than a third order according to which the data was written to the set of source data blocks: and transferring the data from the set of source data blocks to the set of destination data blocks based at least in part on the first order.

Aspect 2: The method, apparatus, or non-transitory computer-readable medium of aspect 1, where transferring the data includes operations, features, circuitry, logic, means, or instructions, or any combination thereof for sensing the data from the set of source data blocks to a volatile memory device of the memory system according to the first order and writing the data from the volatile memory device to the set of destination data blocks according to the first order based at least in part on sensing the data to the volatile memory device according to the first order.

Aspect 3: The method, apparatus, or non-transitory computer-readable medium of any of aspects 1 through 2, where transferring the data includes operations, features, circuitry, logic, means, or instructions, or any combination thereof for transferring a first portion of the data from the set of source data blocks to a first destination data block of the set of destination data blocks and transferring, after transferring the first portion of the data, a second portion of the data from the set of source data blocks to a second destination data block of the set of destination data blocks.

Aspect 4: The method, apparatus, or non-transitory computer-readable medium of any of aspects 1 through 3, where generating the first order includes operations, features, circuitry, logic, means, or instructions, or any combination thereof for determining the third order based at least in part on a mapping between logical addresses of the data and physical addresses of the data within the set of source data blocks and modifying the third order based at least in part on the second order to generate the first order.

Aspect 5: The method, apparatus, or non-transitory computer-readable medium of any of aspects 1 through 4, where generating the first order includes operations, features, circuitry, logic, means, or instructions, or any combination thereof for generating a fourth order for transferring respective portions of the data to the set of destination data blocks based at least in part on the third order and generating the first order based at least in part on transposing the fourth order.

Aspect 6: The method, apparatus, or non-transitory computer-readable medium of any of aspects 1 through 5, further including operations, features, circuitry, logic, means, or instructions, or any combination thereof for sequentially reading the data from the set of destination data blocks according to the second order based at least in part on the transferring the data according to the first order and transmitting the sequentially read data to a host system coupled with the memory system.

Aspect 7: The method, apparatus, or non-transitory computer-readable medium of aspect 6, where sequentially reading the data includes operations, features, circuitry, logic, means, or instructions, or any combination thereof for transferring, via a first channel, a first portion of the data according to the second order to a volatile memory device of the memory system for transmission to the host system: transferring, after or concurrent with transferring the first portion of the data via a second channel, a second portion of the data according to the second order to the volatile memory device for transmission to the host system; and transferring, after or concurrent with transferring the second portion of the data via the first channel, a third portion of the data according to the second order to the volatile memory device for transmission to the host system.

Aspect 8: The method, apparatus, or non-transitory computer-readable medium of any of aspects 1 through 7, where the set of source data blocks includes a source virtual block associated with a set of memory dies of the memory system and the set of destination data blocks includes a destination virtual block associated with the set of memory dies of the memory system.

Aspect 9: The method, apparatus, or non-transitory computer-readable medium of aspect 8, where transferring the data includes operations, features, circuitry, logic, means, or instructions, or any combination thereof for transferring a first portion of the data from portions of the set of memory dies associated with the source virtual block to a portion of a first memory die associated with the destination virtual block and transferring, after transferring the first portion of the data, a second portion of the data from portions of the set of memory dies associated with the source virtual block to a portion of a second memory die associated with the destination virtual block.

Aspect 10: The method, apparatus, or non-transitory computer-readable medium of any of aspects 1 through 7, where each source data block of the set of source data blocks and each destination data block of the set of destination data blocks is associated with one or more virtual blocks of a respective memory die of the memory system.

Aspect 11: The method, apparatus, or non-transitory computer-readable medium of any of aspects 1 through 10, where the set of source data blocks include SLCs, MLCs, TLCs, QLCs, or any combination thereof and the set of destination data blocks include quad-level cells.

It should be noted that the described techniques include possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, or symbols of signaling that may be referenced throughout the above description may be represented by voltages, currents, electromagnetic waves, magnetic fields or particles, optical fields or particles, or any combination thereof. Some drawings may illustrate signals as a single signal: however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow:

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary." used herein means "serving as an example, instance, or illustration" and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, the described functions can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of these are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:
one or more memory devices; and
a controller coupled with the one or more memory devices and configured to cause the apparatus to:
determine to transfer data from a set of source data blocks of the apparatus to a set of destination data blocks of the apparatus;
generate, based at least in part on determining to transfer the data, a first order for transferring respective portions of the data to the set of destination data blocks in accordance with a single-die access operation, the first order associated with a second order associated with a sequential read of the data from the set of destination data blocks in accordance with a multi-die access operation and different than a third order according to which the data was written to the set of source data blocks; and
transfer the data from the set of source data blocks to the set of destination data blocks based at least in part on the first order.

2. The apparatus of claim 1, wherein, to transfer the data, the controller is configured to cause the apparatus to:
sense the data from the set of source data blocks to a volatile memory device of the apparatus according to the first order; and
write the data from the volatile memory device to the set of destination data blocks according to the first order based at least in part on sensing the data to the volatile memory device according to the first order.

3. The apparatus of claim 1, wherein, to transfer the data, the controller is configured to cause the apparatus to:
transfer a first portion of the data from the set of source data blocks to a first destination data block of the set of destination data blocks; and
transfer, after transferring the first portion of the data, a second portion of the data from the set of source data blocks to a second destination data block of the set of destination data blocks.

4. The apparatus of claim 1, wherein, to generate the first order, the controller is configured to cause the apparatus to:
determine the third order based at least in part on a mapping between logical addresses of the data and physical addresses of the data within the set of source data blocks; and modify the third order based at least in part on the second order to generate the first order.

5. The apparatus of claim 1, wherein the controller is further configured to cause the apparatus to:

sequentially read the data from the set of destination data blocks according to the second order based at least in part on the transferring the data according to the first order; and transmit the sequentially read data to a host system coupled with the apparatus.

6. The apparatus of claim 5, wherein, to sequentially read the data, the controller is configured to cause the apparatus to:

transfer, via a first channel, a first portion of the data according to the second order to a volatile memory device of the apparatus for transmission to the host system;

transfer, after or concurrent with transferring the first portion of the data via a second channel, a second portion of the data according to the second order to the volatile memory device for transmission to the host system; and transfer, after or concurrent with transferring the second portion of the data via the first channel, a third portion of the data according to the second order to the volatile memory device for transmission to the host system.

7. The apparatus of claim 1, wherein:

the set of source data blocks comprises a source virtual block associated with a set of memory dies of the apparatus; and the set of destination data blocks comprises a destination virtual block associated with the set of memory dies of the apparatus.

8. The apparatus of claim 7, wherein, to transfer the data, the controller is configured to cause the apparatus to:

transfer a first portion of the data from portions of the set of memory dies associated with the source virtual block to a portion of a first memory die associated with the destination virtual block; and transfer, after transferring the first portion of the data, a second portion of the data from portions of the set of memory dies associated with the source virtual block to a portion of a second memory die associated with the destination virtual block.

9. The apparatus of claim 1, wherein each source data block of the set of source data blocks and each destination data block of the set of destination data blocks is associated with one or more virtual blocks of a respective memory die of the apparatus.

10. The apparatus of claim 1, wherein:

the set of source data blocks comprise single-level cells, multi-level cells, tri-level cells, quad-level cells, or any combination thereof, and the set of destination data blocks comprise quad-level cells.

11. An apparatus, comprising:

one or more memory devices; and a controller coupled with the one or more memory devices and configured to cause the apparatus to:

determine to transfer data from a set of source data blocks of the apparatus to a set of destination data blocks of the apparatus;

generate, based at least in part on determining to transfer the data, a fourth order for transferring respective portions of the data to the set of destination data blocks based at least in part on a third order according to which the data was written to the set of source data blocks;

generate a first order based at least in part on transposing the fourth order, the first order for transferring respective portions of the data to the set of destination data blocks, wherein the first order is associated with a second order associated with a sequential read of the data from the set of destination data blocks and different than the third order; and transfer the data from the set of source data blocks to the set of destination data blocks based at least in part on the first order.

12. A non-transitory computer-readable medium storing code comprising instructions which, when executed by a processor of an electronic device, cause the electronic device to:

determine to transfer data from a set of source data blocks of a memory system to a set of destination data blocks of the memory system;

generate, based at least in part on determining to transfer the data, a first order for transferring respective portions of the data to the set of destination data blocks, the first order associated with a second order associated with a sequential read of the data from the set of destination data blocks in accordance with a multi-die access operation and different than a third order according to which the data was written to the set of source data blocks in accordance with a single-die access operation; and transfer the data from the set of source data blocks to the set of destination data blocks based at least in part on the first order.

13. The non-transitory computer-readable medium of claim 12, wherein the instructions to transfer the data, when executed by the processor of the electronic device, cause the electronic device to:

sense the data from the set of source data blocks to a volatile memory device of the memory system according to the first order; and write the data from the volatile memory device to the set of destination data blocks according to the first order based at least in part on sensing the data to the volatile memory device according to the first order.

14. The non-transitory computer-readable medium of claim 12, wherein the instructions to generate the first order, when executed by the processor of the electronic device, cause the electronic device to:

determine the third order based at least in part on a mapping between logical addresses of the data and physical addresses of the data within the set of source data blocks; and modify the third order based at least in part on the second order to generate the first order.

15. The non-transitory computer-readable medium of claim 12, wherein the instructions are further executable by the processor to:

sequentially read the data from the set of destination data blocks according to the second order based at least in part on the transferring the data according to the first order; and transmit the sequentially read data to a host system coupled with the memory system.

16. A non-transitory computer-readable medium storing code comprising instructions which, when executed by a processor of an electronic device, cause the electronic device to:

determine to transfer data from a set of source data blocks of a memory system to a set of destination data blocks of the memory system;

generate, based at least in part on determining to transfer the data, a fourth order for transferring respective portions of the data to the set of destination data blocks based at least in part on a third order according to which the data was written to the set of source data blocks;

generate a first order based at least in part on transposing the fourth order, the first order for transferring respective portions of the data to the set of destination data blocks, wherein the first order is associated with a second order associated with a sequential read of the data from the set of destination data blocks and different than the third order; and transfer the data from the set of source data blocks to the set of destination data blocks based at least in part on the first order.

17. A method, comprising:

determining to transfer data from a set of source data blocks of a memory system to a set of destination data blocks of the memory system;

generating, based at least in part on determining to transfer the data, a first order for transferring respective portions of the data to the set of destination data blocks, the first order associated with a second order associated with a sequential read of the data from the set of destination data blocks in accordance with a multi-die access operation and different than a third order according to which the data was written to the set of source data blocks in accordance with a single-die access operation; and transferring the data from the set of source data blocks to the set of destination data blocks based at least in part on the first order.

18. The method of claim 17, wherein transferring the data comprises:

sensing the data from the set of source data blocks to a volatile memory device of the memory system according to the first order; and writing the data from the volatile memory device to the set of destination data blocks according to the first order based at least in part on sensing the data to the volatile memory device according to the first order.

19. The method of claim 17, wherein generating the first order comprises:

determining the third order based at least in part on a mapping between logical addresses of the data and physical addresses of the data within the set of source data blocks; and modifying the third order based at least in part on the second order to generate the first order.

20. A method, comprising:

determining to transfer data from a set of source data blocks of a memory system to a set of destination data blocks of the memory system;

generating, based at least in part on determining to transfer the data, a fourth order for transferring respective portions of the data to the set of destination data blocks based at least in part on a third order according to which the data was written to the set of source data blocks;

generating a first order based at least in part on transposing the fourth order, the first order for transferring respective portions of the data to the set of destination data blocks, wherein the first order is associated with a second order associated with a sequential read of the data from the set of destination data blocks and different than the third order; and transferring the data from the set of source data blocks to the set of destination data blocks based at least in part on the first order.

* * * * *